(12) United States Patent
Förster et al.

(10) Patent No.: US 6,769,299 B2
(45) Date of Patent: Aug. 3, 2004

(54) INTEGRAL DUAL TECHNOLOGY FLOW SENSOR

(75) Inventors: Karl-Heinz Förster, Dresden (DE); Josef Binder, Huntington, NY (US)

(73) Assignee: Fetso Corporation, Hauppauge, NY (US)

( * ) Notice: Subject to any disclaimer, the term of this patent is extended or adjusted under 35 U.S.C. 154(b) by 0 days.

(21) Appl. No.: 10/339,131

(22) Filed: Jan. 8, 2003

(65) Prior Publication Data

US 2004/0129072 A1 Jul. 8, 2004

(51) Int. Cl.$^7$ .................................................. G01F 1/68
(52) U.S. Cl. ................................. 73/204.26; 73/861.74
(58) Field of Search ......................... 73/205.15, 204.26, 73/204.21, 861.74

(56) References Cited

U.S. PATENT DOCUMENTS

| | | | |
|---|---|---|---|
| 3,424,000 A | | 1/1969 | Chelner et al. |
| 3,927,565 A | | 12/1975 | Pavlin et al. |
| 4,729,244 A | | 3/1988 | Furuse |
| 4,875,932 A | | 10/1989 | Uchiyama et al. |
| 4,986,127 A | | 1/1991 | Shimada et al. |
| 5,000,226 A | | 3/1991 | Stoll et al. |
| 5,086,650 A | * | 2/1992 | Harrington et al. ...... 73/204.21 |
| 5,144,843 A | | 9/1992 | Tamura et al. |
| 5,187,984 A | | 2/1993 | Mosser et al. |
| 5,259,248 A | | 11/1993 | Ugai et al. |
| 5,348,047 A | | 9/1994 | Stoll et al. |
| 5,383,470 A | | 1/1995 | Kolbly |
| 5,458,048 A | | 10/1995 | Hohner |
| 5,463,904 A | | 11/1995 | Kalinoski |
| 5,469,749 A | | 11/1995 | Shimada et al. |
| 5,495,769 A | | 3/1996 | Broden et al. |
| 5,515,714 A | * | 5/1996 | Sultan et al. ............. 73/204.26 |
| 5,546,794 A | | 8/1996 | Kuhn et al. |
| 5,717,147 A | | 2/1998 | Basch et al. |
| 5,791,369 A | | 8/1998 | Nishino et al. |
| 5,820,262 A | | 10/1998 | Lechner |
| 5,868,159 A | | 2/1999 | Loan et al. |
| 5,899,962 A | | 5/1999 | Louwagie et al. |
| 5,965,813 A | | 10/1999 | Wan |
| 6,023,969 A | | 2/2000 | Feller |
| 6,253,606 B1 | * | 7/2001 | Yonezawa et al. ....... 73/204.26 |
| 6,295,874 B1 | | 10/2001 | Strutt et al. |
| 6,408,698 B1 | | 6/2002 | Brereton et al. |
| 6,443,328 B1 | | 9/2002 | Fehl et al. |
| 6,470,741 B1 | | 10/2002 | Fathollahzadeh |
| 6,561,216 B2 | | 5/2003 | Kurosawa |
| 6,615,867 B2 | | 9/2003 | Tajima et al. |
| 6,631,638 B2 | | 10/2003 | James et al. |
| 2003/0159697 A1 | | 8/2003 | Wallace |

FOREIGN PATENT DOCUMENTS

JP              3-18735            1/1991

OTHER PUBLICATIONS

Jørgensen, Finn E., "How to Measure Turbulence with Hot–Wire Anemometers", Dantec Dynamics, Publication No: 9040U6151, Feb. 1, 2002.

* cited by examiner

*Primary Examiner*—Harshad Patel
(74) *Attorney, Agent, or Firm*—Hoffmann & Baron, LLP

(57) ABSTRACT

A flow sensor includes a mounting plate, bending plate, and a sensing assembly. The mounting plate is mounted to an internal surface of an air hose. The mounting plate is flexibly coupled to the bending plate, which is displaced in response to the flow of gas. The sensing assembly is positioned on the bending plate and includes a temperature sensor for sensing relatively lower flow rates during a thermal mode, and one or more displacement sensors for sensing relatively higher flow rates during a displacement mode. The temperature sensor outputs a thermal mode signal and the displacement sensors output a displacement mode signal. A flow sensing system includes the flow sensor, processor, memory, and a computer. The processor is responsive to the thermal and displacement mode signals. The computer is coupled to the processor and controls calibration of the flow sensor.

34 Claims, 6 Drawing Sheets

INTEGRAL DUAL TECHNOLOGY FLOW SENSOR

BACKGROUND OF THE INVENTION

1. Field of the Invention

The present invention generally relates to a fluid sensor for measuring the flow of a gaseous media, and relates more particularly to a universal flow sensor that is suitable for use in pneumatic circuits exhibiting a wide range of flow rates without substantial modification.

2. Description of the Prior Art

There are essentially three prevailing methods used to measure flow. The first is inferential flow measurement, which senses a difference in pressure across an orifice restriction. The second method uses a thermal sensor, which is also referred to as a constant temperature anemometer, to monitor temperature changes that are dependant upon the speed of the media, as described in U.S. Pat. No. 6,470,741 to Fathollahzadeh, which is incorporated herein by reference. The third method utilizes displacement sensors that detect mechanical displacement of a portion of the sensor caused by the flow of media.

Each of these methods has different application ranges, as well as inherent advantages and disadvantages. Inferential flow measurement generally requires two pressure sensors and a restriction in flow. A temperature sensor is also typically required with this method to compensate for variations in pressure due solely to temperature fluctuations. However, the requirement of multiple sensors substantially increases failure rate and installation cost. Thus, application of inferential flow measurement principles become practical in only limited circumstances.

The remaining two sensor methods do not require multiple sensors, but have other drawbacks. Typically, thermal sensors are used for lower flow rates while displacement sensors are used for relatively higher flow rates. Selection of the most appropriate flow sensor for a particular application requires a detailed knowledge of the anticipated range of measurements, the potential physical characteristics of the media, such as pressure, temperature, and the like, and the environmental characteristics of the location in which the media is to be measured. Accordingly, use of either thermal sensors or displacement sensors generally requires a customized solution for each particular application.

OBJECTS AND SUMMARY OF THE INVENTION

It is an object of the present invention to provide a universal flow sensor and system that are generically applicable and that do not require substantial modification over a wide range of measurement parameters.

It is another object of the present invention to provide a universal flow sensor and system that utilize both thermal sensing and displacement sensing to measure flow over an extended range of physical conditions.

It is yet another object of the present invention to provide a universal flow sensor and system that are able to multiplex flow rate measurement information obtained in a low flow mode with those obtained in a high flow mode.

A flow sensor formed in accordance with one form of the present invention, which incorporates some of the preferred features, includes a mounting plate, bending plate, and sensing assembly. The mounting plate is adapted to be mounted to an internal surface of a conduit, which directs the flow of a gaseous medium. The bending plate is flexibly coupled to the mounting plate and is displaced in response to the flow of gas in the conduit.

The sensing assembly is positioned on the bending plate and includes at least one sensor adapted for sensing temperature changes in response to the flow of gas during a thermal mode. The sensing assembly includes at least one sensor adapted for sensing displacement of the bending plate in response to the flow of gas during a displacement mode. The temperature outputs a thermal mode signal representative of a change in temperature in response to the flow of gas. The displacement sensor outputs a displacement mode signal representative of a change in mechanical stress in response to displacement of the bending plate due to the flow of gas.

A flow sensing system formed in accordance with the present invention, which incorporates some of the preferred features, includes the flow sensor described above, a processor, memory, and a computer. The processor is responsive to the thermal and displacement mode signals and the memory is operatively coupled to the processor. The computer is operatively coupled to the processor and controls calibration of the flow sensor in both the thermal and displacement modes.

These and other objects, features, and advantages of this invention will become apparent from the following detailed description of illustrative embodiments thereof, which is to be read in connection with the accompanying drawings.

DETAILED DESCRIPTION OF THE PREFERRED EMBODIMENTS

A universal flow sensor formed in accordance with the present invention preferably includes a sensor assembly that is switched between a constant temperature anemometer or thermal mode for sensing low values of flow and a displacement mode for sensing substantially higher values of flow of a gaseous medium. The universal flow sensor can also be used to sense the flow of liquids, compositions, slurries, and the like if the sensing elements are appropriately protected. The sensor assembly is preferably switched between the thermal and displacement modes by a multiplexing system that acquires measurement data in each of the modes sequentially or in a dedicated manner.

Figure 1:
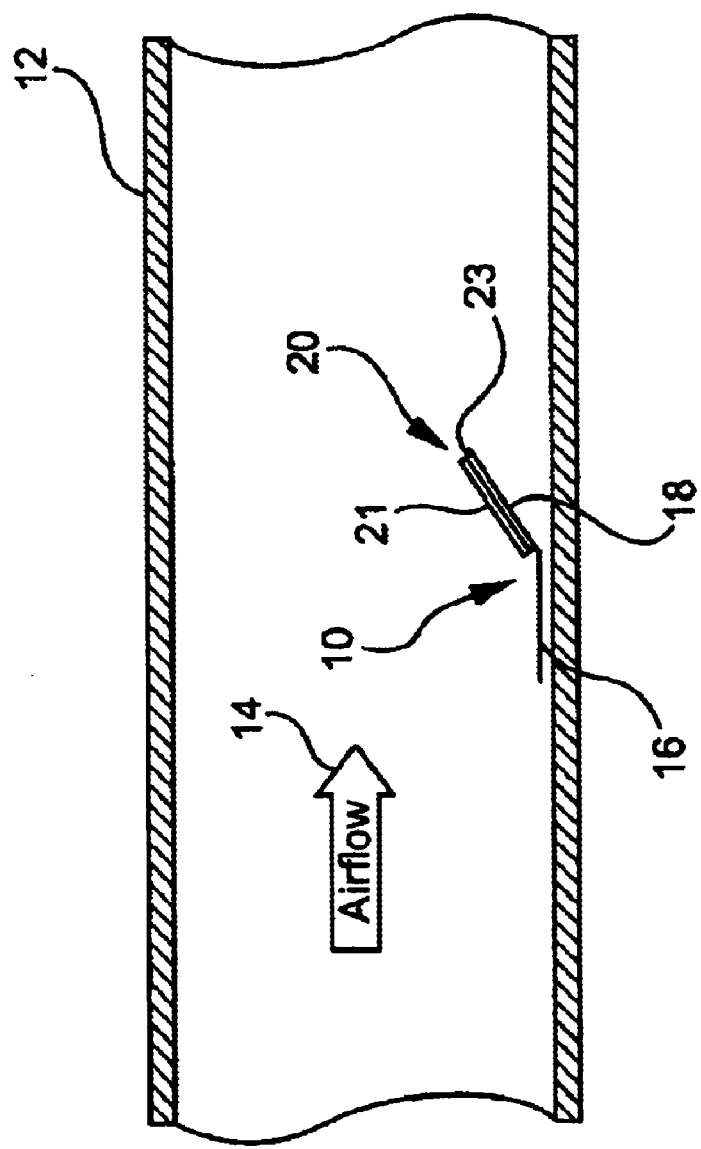
FIG. 1 is a side cross-sectional view of a universal flow sensor formed in accordance with the present invention.

FIG. 1 is a side cross-sectional view of the universal flow sensor 10, which is preferably mounted within a conduit or air hose 12. The air hose 12 guides the flow of gas in the direction of an arrow 14. The flow sensor 10 preferably includes a mounting plate 16 and a bending plate 18.

The mounting plate 16 is preferably affixed or mounted to a wall of the air hose 12. The bending plate 18 preferably makes an acute angle with a wall of the air hose 12 and an obtuse angle with the mounting plate 16. The bending plate 18 is preferably surrounded by the flow of gas and may have a special shape to increase mechanical displacement of the bending plate 18 in response to this flow.

A sensor assembly 20 is preferably mounted on that side of the bending plate 18 that opposes the direction of flow, as indicated by arrow 14. The sensor assembly 20 preferably includes one or more sensors. The sensors are resistors, which are made from the same or similar material, that operate as strain gauges. That is, the resistors exhibit a change in resistance that is proportional to the elongation caused by bending the bending plate 18 by the flow of gas. One or more of the resistors preferably also provide for temperature compensation.

The sensors in the sensor assembly 20 are preferably connected in a full bridge configuration, which measures displacement of the bending plate 18 caused by flow in the air hose 12 during the displacement mode. At least a portion of the sensor assembly 20 is also preferably exposed to the flow of gas for use as a constant temperature anemometer during the thermal mode.

Figure 2A:
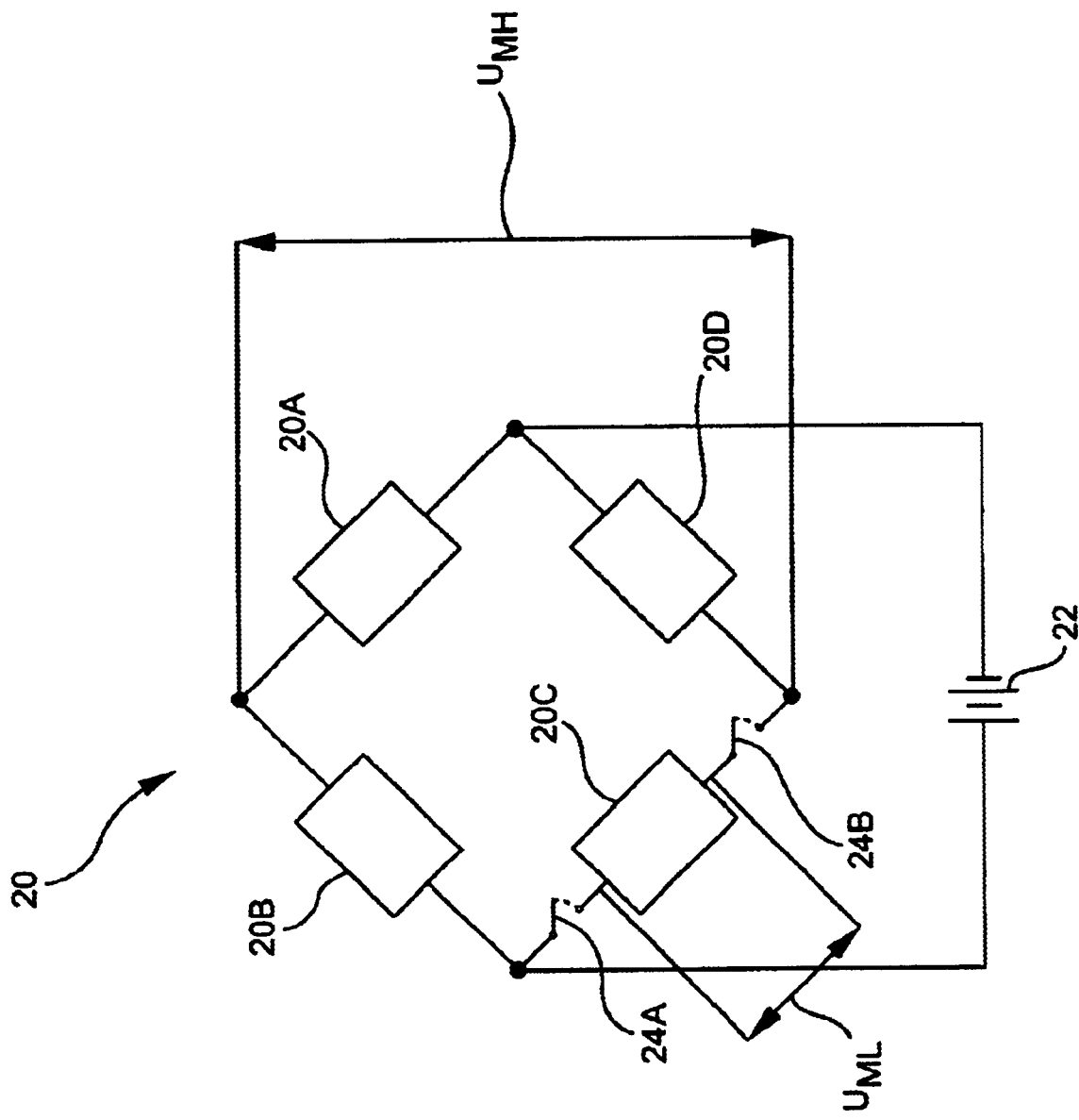
FIG. 2a is a schematic diagram of a first embodiment of a sensing assembly for use in the flow sensor formed in accordance with the present invention.

FIG. 2a is a schematic diagram showing the preferred interconnections between individual sensors in the sensor assembly 20. The sensor assembly 20 preferably includes four (4) resistors or sensors 20A, 20B, 20C, and 20D, which are preferably arranged on that side of the bending plate 18 facing the arrow 14 shown in FIG. 1.

Sensors 20A, 20B, 20C, and 20D are preferably electrically connected in a bridge circuit configuration. A power supply 22 includes a first terminal and a second terminal. The first terminal of the power supply 22 is preferably connected to a node connecting sensors 20B and 20C, and the second terminal is preferably connected to a node connecting sensors 20A and 20D.

Switches 24A and 24B, which may be implemented using, for instance, electromechanical relays, preferably isolate both terminals of sensor 20C from the bridge circuit, which enables sensor 20C to operate as a constant temperature anemometer in the thermal mode. A voltage $U_{ML}$, which is preferably measured across the terminals of sensor 20C while sensor 20C is disconnected from the bridge circuit by switches 24A and 24B, represents a change in resistance as a result of the heat transferred by the gas flow, and thus provides a measure of gaseous flow in the air hose 12 during the thermal mode. A voltage $U_{MH}$ is preferably measured across a node connecting sensors 20A and 20B, and a node connecting sensors 20C and 20D. The voltage $U_{MH}$ preferably represents a change in resistance caused by mechanical stress experienced by sensors 20B and 20D during the displacement mode. Sensors 20A and 20C are preferably used for temperature compensation in the displacement mode.

Figure 2B:
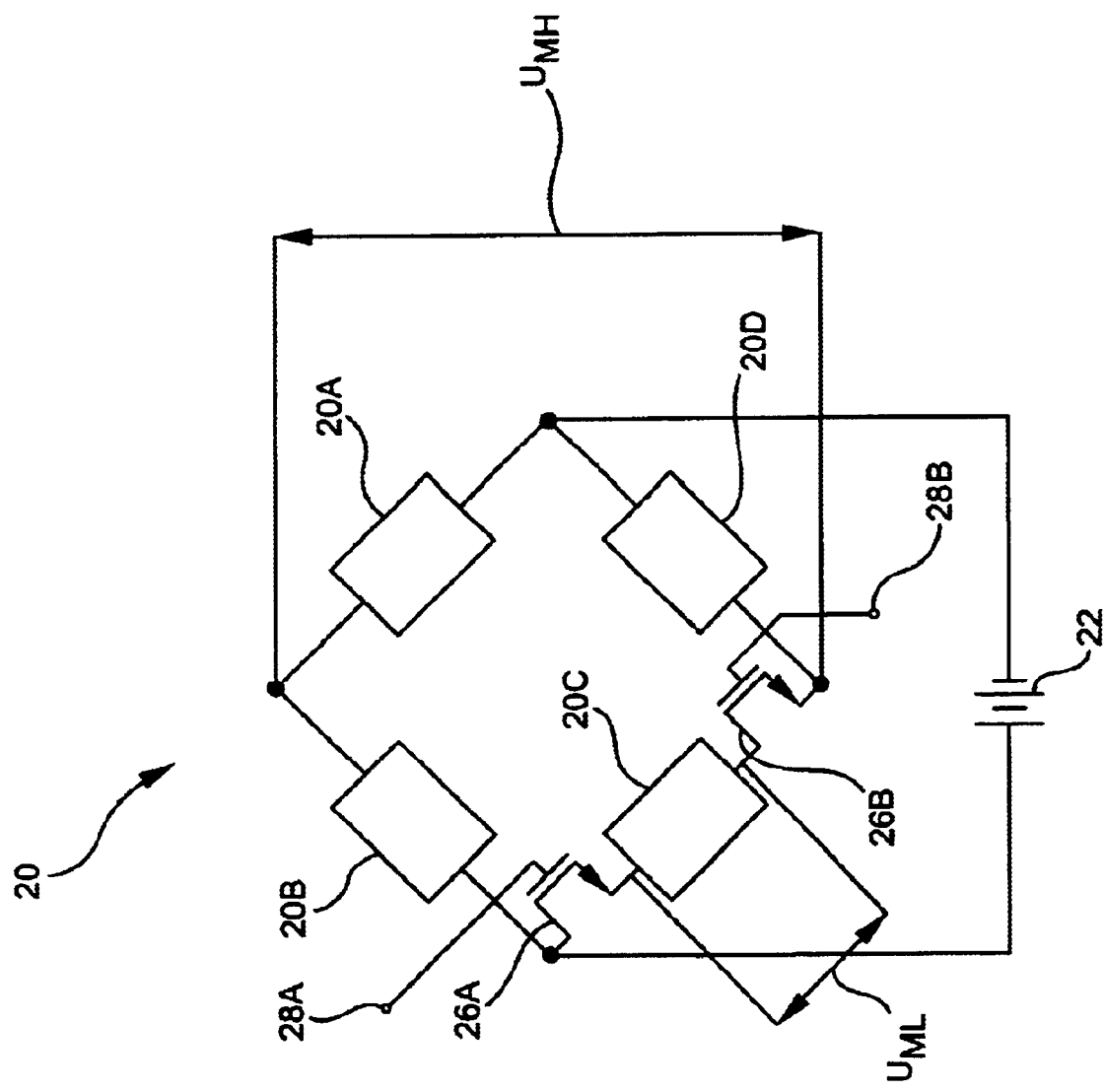
FIG. 2b is a schematic diagram of a second embodiment of a sensing assembly for use in the flow sensor formed in accordance with the present invention.

Thus, the flow sensor 10 formed in accordance with the present invention enables the measurement of a relatively lower rate of flow during the thermal mode and a relatively higher rate of flow during the displacement mode. If these modes are to be multiplexed, the two switches isolating sensor 20C from the bridge circuit are preferably implemented as two solid-state switches, such as two field effect transistors (FET) 26A and 26B, as shown in FIG. 2b. The FET switches 26A and 26B are controlled by corresponding gate voltage signals 28A and 28B, which are preferably connected to a signal processing circuit that selects either the thermal mode or displacement mode.

Sensors 20B and 20D are preferably arranged on the bending plate 18 such that sensors 20B and 20D experience mechanical stress caused by distortion of the bending plate 18 in response to the flow of gas during the displacement mode. In addition, both sensors 20B and 20D are preferably in opposing branches of the bridge circuit, as shown in FIGS. 2a and 2b.

Sensors 20A and 20C are preferably arranged on the bending plate such that sensors 20A and 20C do not experience a substantial amount of stress caused by distortion of the bending plate 18 in response to the flow of gas during the displacement mode. Both sensors 20A and 20C are preferably also in opposing branches of the full bridge circuit, as shown in FIGS. 2a and 2b. Sensors 20A and 20C preferably exhibit the same nominal resistance as sensors 20B and 20D and are preferably used for temperature compensation in the full bridge circuit.

In an alternative embodiment, sensor 20C may be left connected to the remaining resistors in the bridge circuit during the thermal mode. In this embodiment, sensor 20C is retained in the bridge circuit during both the thermal mode and the displacement mode. Thus, the switches 24A and 24B (FIG. 2a), FET switches 26A and 26B (FIG. 2b), and gate voltage signals 28A and 28B (FIG. 2b) are preferably not required in this embodiment.

This alternative embodiment is preferred if the cross-sensitivity of the displacement sensors 20B and 20D is relatively low at low flow rates, which correspond to a nominal or expected range of measurements in the thermal mode. The term "cross-sensitivity" is defined herein as the effect that mechanical stress has on displacement sensors 20B and 20D during low flow measurements in the thermal mode while sensor 20C is connected to the bridge circuit.

A characteristic curve, or a lookup table representing such a curve, which indicates the cross sensitivity of the displacement sensors in the thermal mode, is preferably programmed into non-volatile memory, such as electrically erasable programmable read only memory (EEPROM), if such errors cannot be neglected. This information can then be used to compensate for cross sensitivity errors when determining the value of $U_{ML}$ during measurements in the thermal mode.

MEMS structure of the sensor will now be described. MEMS (Micro-Electro-Mechanical System) refers to the integration of mechanical and electrical elements on a common silicon substrate by utilizing microfabrication techniques. The mechanical and electrical elements can either have the function of a sensor or an actuator. The electronic circuits are fabricated using integrated circuit (IC) processes, such as CMOS (Complementary Metal Oxide Semiconductor), bipolar, or BICMOS (Bipolar Complementary Metal Oxide Semiconductor) processes. The micromechanical components are fabricated using compatible micromachining processes, which selectively etch away portions of a silicon wafer or add new structural layers to form mechanical and electromechanical devices.

The flow sensor 10 shown in FIG. 1 includes the sensor assembly 20 mounted on the bending plate 18, which is preferably made from either silicon, glass, or a metal, such as Covar™. The bending plate 18 preferably provides support for a functional layer 21 and one or more isolation layers 23 of the sensor assembly 20. As shown in FIGS. 2a and 2b, the functional layer preferably includes sensors 20A, 20B, 20C, and 20D. As shown in FIG. 1, the functional layer 21 of the sensor assembly 20 is preferably isolated from the bending plate 18 by one or more isolation layers 23 that are made from materials that are compatible with CMOS processes, such as silcon oxide or silcon nitride.

The bending plate 18 is preferably made from polycrystalline silicon if the mounting plate 16 is made from silicon or glass. However, if the mounting plate 16 is metallic, the bending plate 18 is preferably made from the same material as the mounting plate 16.

Preferred processes for manufacturing the bending plate 18 to create a cantilevered structure in accordance with the present invention will now be described. The functional and isolation layers are deposited on a structured sacrificial layer, which is preferably either silicon oxide or silicon nitride. In the field of surface micromachining, small etch channels can be implemented in the functional and isolation layers using photolithography. These channels enable an etching gas or liquid to reach the sacrificial layer and remove the sacrificial layer while retaining the functional and isolation layers. For relaxation of the bending plate 18 prior to bending, the sacrificial layer is preferably removed in an etching process. For bending the plate, a predefined stress is preferably applied to the layer building up the bending plate. An initial bending of the bending plate is preferably created either by varying a doping concentration or implementing a stress gradient using different annealing profiles.

A constant stress gradient is preferably implemented in the bending plate 16 using at least one of two technological processes. In a first approach, a multi-step deposition of an α-silicon or polysilicon layer is followed by supplementary implementation of a stress gradient by doping or ion implantation. The second approach involves depositing nickel using an electroplating process with various current densities followed by a supplementary step of laser recrystallization.

The choice of the process of releasing the sacrificial layer depends on the choice of the material of the functional and sacrificial layers. For instance, if the functional and isolation layers are a-silicon, polysilicon, or nickel, the sacrificial layer is preferably silicon dioxide.

Release of the mounting plate 16 is preferably performed by etching the sacrificial layer. Dry or wet etching processes are may be used.

Figure 3B:
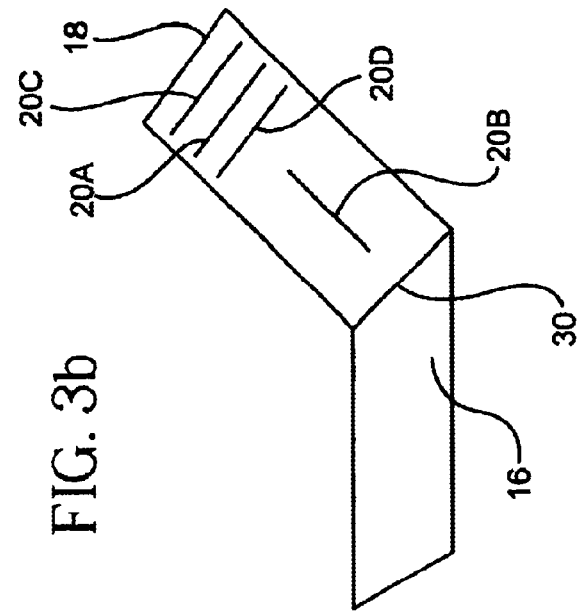
FIG. 3b is an isometric view of a second embodiment of the flow sensor formed in accordance with the present invention.
Figure 3A:
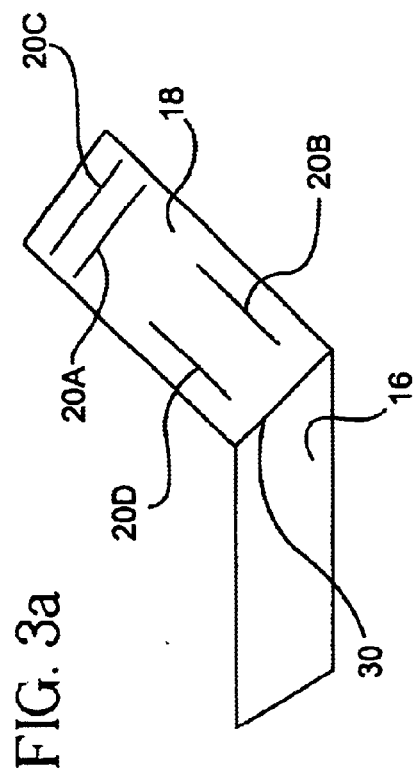
FIG. 3a is an isometric view of a first embodiment of the flow sensor formed in accordance with the present invention.

Sensors 20B and 20D are preferably located on the functional layer 21 in an area of maximum stress during displacement of the bending plate 18, as shown in FIG. 3a. Sensors 20B and 20D are preferably resistors based on either a thin film polycrystalline or platinum layer technology and are deposited using photolithography techniques.

Thus, sensors 20B and 20D are preferably made of the same material as sensors 20A and 20C and, as discussed above, are preferably active and used to indicate stress during the displacement mode. Sensors 20A and 20C are located in an area of the bending plate 18 experiencing substantially lower stress due to displacement of the bending plate, as shown in FIG. 3a.

As indicated above, sensors 20A and 20C are preferably passive or used for temperature compensation during the displacement mode. However, during the thermal mode, sensor 20C is preferably active and used as a hot film element sensor. As described above, in order to reduce cross-sensitivity due to mechanical stress during the displacement mode, sensor 20C is preferably disconnected from the remaining elements of the bridge circuit by electronic switches, such as switches 24A and 24B shown in FIG. 2a or FET switches 28A and 28B shown in FIG. 2b.

As shown in FIG. 3a, sensors 20B and 20D are preferably located near and perpendicular to a bending axis 30, which separates the bending plate 18 from the mounting plate 16. Sensors 20A and 20C are preferably located in an area of the mounting plate 18 that experiences substantially lower stress, which is farther away from the bending axis 30 and parallel to this axis.

In a second or half bridge embodiment of the flow sensor shown in FIG. 3b, only one sensor 20B is preferably used to detect distortion of the bending plate 18 during the displacement mode. Sensor 20B is preferably located in an area of maximum stress, which is near the bending axis 30 and preferably perpendicular to this axis.

The sensor 20B is preferably made from either thin film polycrystalline or platinum layers and deposited using photolithography techniques, as are the remaining sensors 20A, 20C, and 20D in the half bridge embodiment. Sensors 20A, 20C, and 20D are preferably located in an area of the bending plate 16 that experiences relatively lower stress due to displacement, which is farther away from the axis of bending 30 and parallel to this axis, as shown in FIG. 3b.

Sensors 20A, 20C, and 20D are preferably passive or used for temperature compensation during the displacement mode. In the thermal mode, sensor 20C is preferably active, as described above in relation to the full bridge embodiment of the present invention, and sensors 20A, 20B, and 20D are passive or used for temperature compensation.

Figure 3C:
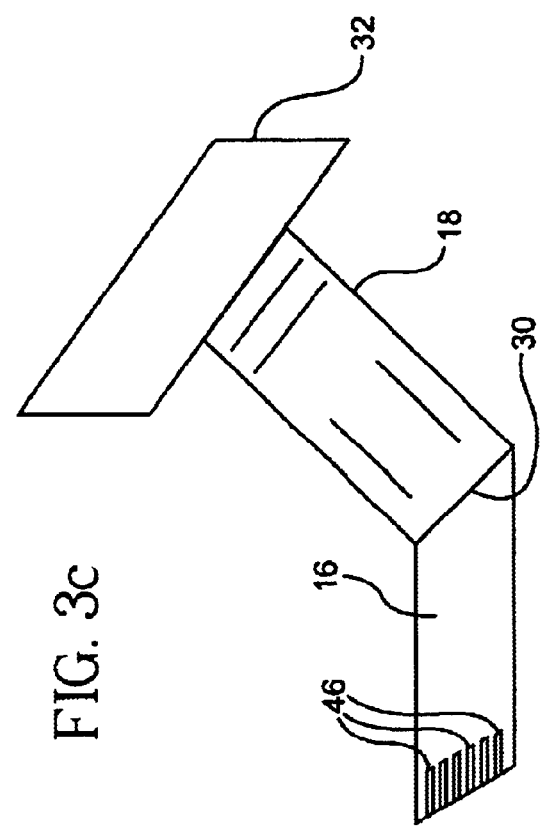
FIG. 3c is an isometric view of a third embodiment of the flow sensor formed in accordance with the present invention.

As shown in a third embodiment of the flow sensor in FIG. 3c, the bending plate 18 may include a blade 32 that is preferably positioned to increase the drag, and thus effect of gas flow on the bending plate 18. Thus, the blade 32 preferably increases the degree of bending of the bending plate 18 in response to the flow.

Figure 4:
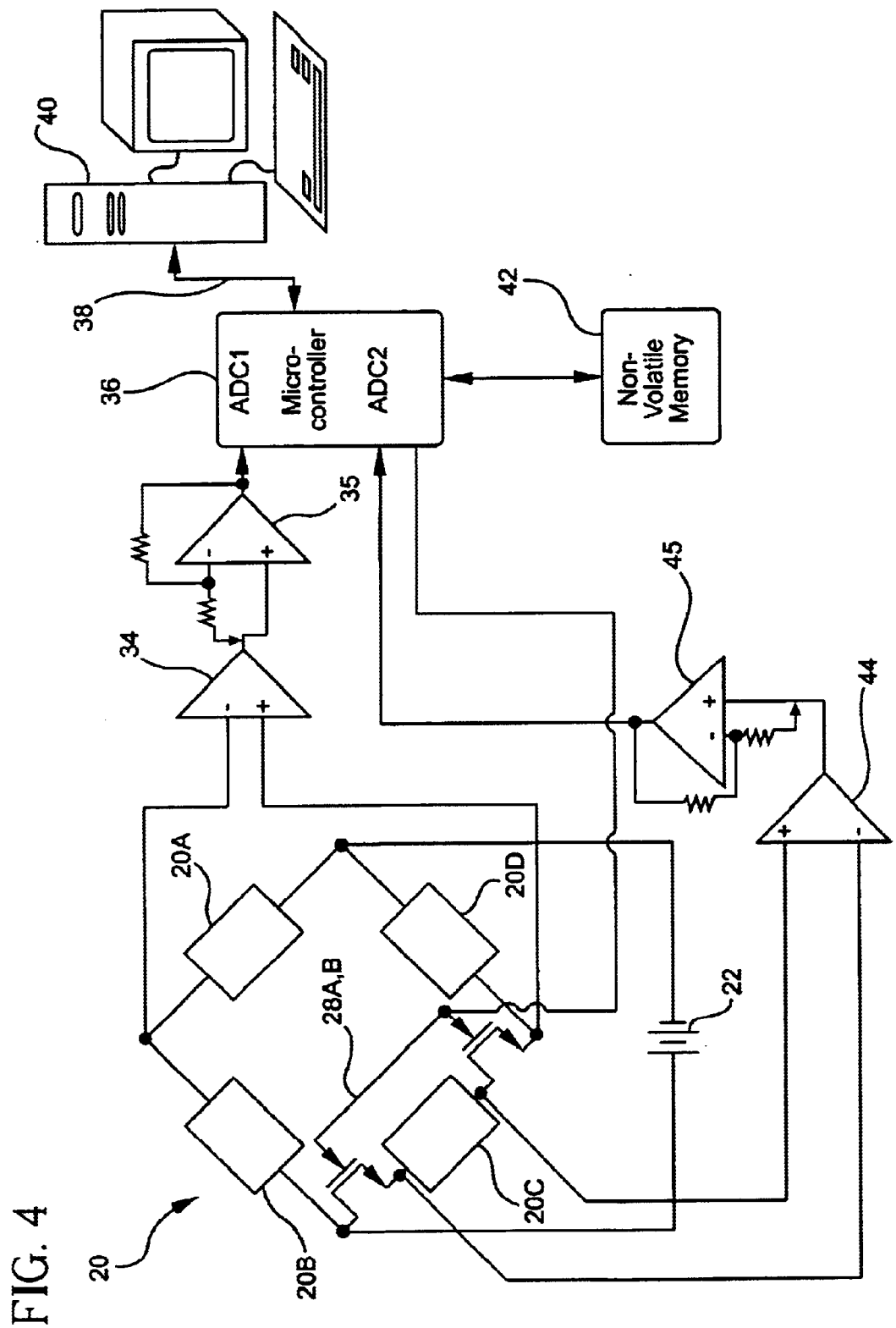
FIG. 4 is a block diagram of a signal processing system for use with the flow sensor formed in accordance with the present invention.

FIG. 4, shows a signal processing for the sensor formed in accordance with the present invention. The node connecting sensors 20A and 20B and the node connecting sensors 20C and 20D are preferably connected to the positive and negative terminals of the amplifier 34. Thus, the amplifier 34 preferably translates the output signal $U_{MH}$ from the bridge circuit shown in FIGS. 2a and 2b to a conditioned analog output signal.

The analog signal outputted from the amplifier 34 is preferably further amplified by amplifier 35 and converted into a digital signal for correction, compensation, and/or calibration of its parameters, such as sensor offset, gain, temperature sensitivity, and non-linearity, by inputting the amplified signal into an analog-to-digital converter input ADC1 of a microcontroller 36, which then performs compensating and/or corrective algorithms.

The microcontroller 36 is preferably linked to a personal computer 40 with a bidirectional serial interface 38. The serial interface 38 preferably enables the personal computer 40 to control the calibration procedure, at least a portion of which is performed in the microcontroller 36. The calibration procedure preferably involves reading uncalibrated sensor and temperature values from the microcontroller 36, calculating a set of calibration coefficients, and programming the coefficients into non-volatile memory 42 coupled to the microcontroller 36. These coefficients are then available for use in compensation by the microcontroller 36 for subsequent measurements.

Signal processing for the thermal mode is also preferably implemented using an instrumentation amplifier 44 shown in FIG. 4. The terminals of sensor 20C are preferably connected to the positive and negative terminals of the amplifier 44. Thus, the amplifier 44 preferably translates the output signal $U_{ML}$ from the bridge circuit to a conditioned analog output signal.

The analog output signal is preferably further amplified by amplifier 45 and converted into a digital signal for correction and compensation of its parameters, by inputting the analog signal from the amplifier 44 into a second analog-to-digital converter input ADC2 of the microcontroller 36, as shown in FIG. 4, which performs compensation and/or corrective algorithms.

In the thermal mode, the temperature of the sensor 20C is maintained at a substantially constant value by providing a variable current through the feedback loop. As the flow of gas increases, the current must also increase to maintain a constant temperature. Thus, the voltage inputted to the analog-to-digital converter input ADC2 of the microcontroller 36 is representative of flow. As in the displacement mode, digital correction and compensation is possible for sensor offset, gain, temperature sensitivity, and non-linearity by the microcontroller 36 operating in accordance with calibration coefficients stored in memory 42 under the control of the personal computer 40 over the bidirectional serial interface 38.

Referring to FIG. 4, the sensors 20A, 20B, 20C, and 20D and the interconnections between these sensors are preferably located on the bending plate 18 shown in FIG. 1. Any additional components, such as the switches 24A, 24B, 26A, 26B (also shown in FIGS. 2a and 2b); amplifiers 34, 35, 44, 45; microcontroller 36, memory 42, and power supply 22, are preferably not located on the bending plate 18 and even more preferably would be located external to the conduit 12 so as not to be subject to physical conditions within the conduit 12, such as airflow. However, the positioning of any or all of the above-identified components within the conduit 12, on the bending plate 18, and/or on the mounting plate 16 is considered to be well within the scope of the present invention.

Electrical connections between the components located on the bending plate 18 and those located external to the bending plate 18 are preferably provided through interconnection with electrical contacts 46 shown in FIG. 3c. Referring to FIG. 2a, if the switches are not located on the bending plate 18, one of the contacts 46 shown in FIG. 3c is preferably electrically coupled to each of the nodes connecting the sensors 20A, 20B, 20C, 20D; the terminals of sensor 20C; and the coils of switches 24A, 24B, which results in six (6) total contacts. Similarly, referring to FIG. 2b, if again the switches are not located on the bending plate 18, one of the contacts 46 shown in FIG. 4 is preferably electrically coupled to each of the nodes connecting the sensors 20A, 20B, 20C, 20D; the terminals of sensor 20C; and the gates of FET switches 26A, 26B, which also results in eight (8) total contacts.

However, referring to FIG. 2a, if the switches are located on the bending plate 18, one of the contacts 46 shown in FIG. 3c is preferably electrically coupled to each of the nodes connecting the sensors 20A, 20B, 20C, 20D and the terminals of sensor 20C, which results in only six (6) total contacts. Similarly, referring to FIG. 2b, if again the switches are located on the bending plate 18, one of the contacts 46 shown in FIG. 4 is preferably electrically coupled to each of the nodes connecting the sensors 20A, 20B, 20C, 20D and the terminals of sensor 20C, which also results in only six (6) total contacts.

Figure 5A:
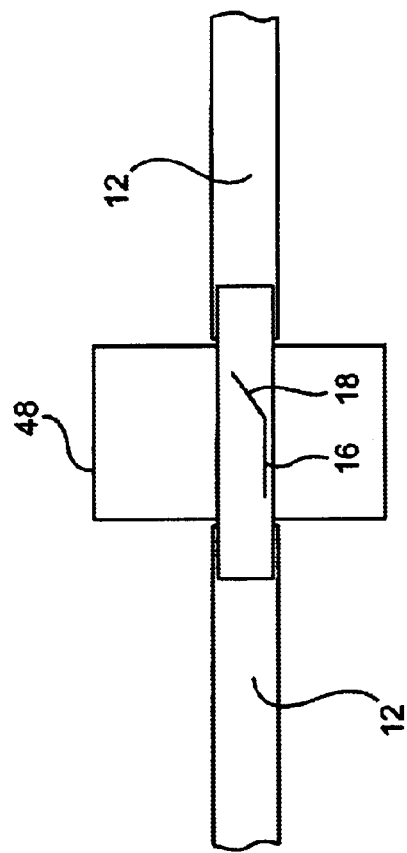
FIG. 5a is a side cross-sectional view of a first embodiment for mounting the flow sensor formed in accordance with the present invention.
Figure 5B:
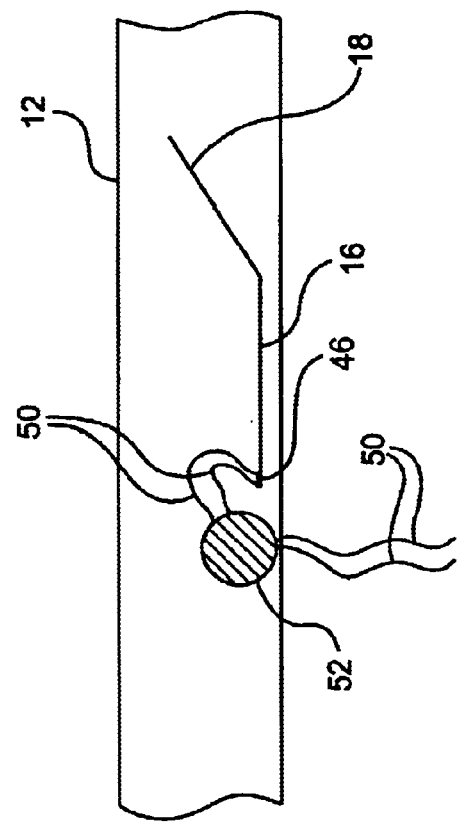
FIG. 5b is a side cross-sectional view of a second embodiment for mounting the flow sensor formed in accordance with the present invention.

As shown in FIG. 5a, the flow sensor may be incorporated into an in-line module, to which segments of the conduit 12 are attached. Additional components and wiring to these components would then preferably be located internal and/or external to the module. Alternatively, the flow sensor may be mounted by any known means to an internal surface of the conduit, as shown in FIG. 5b. Interconnection between components on the flow sensor and components external to the conduit 12 would preferably be made using wires 50 extending from contacts 46 on the flow sensor through a sealed orifice 52 in the conduit to components located external to the conduit 12.

Therefore, the universal flow sensor and system formed in accordance with the present invention are generically applicable and utilize both thermal sensing and displacement sensing to measure flow over an extended range of measurement parameters without requiring substantial modifications. The flow sensor and system are also able to multiplex flow rate measurement information obtained in a low flow rate or thermal mode and a high flow rate or displacement mode.

Although illustrative embodiments of the present invention have been described herein with reference to the accompanying drawing, it is to be understood that the invention is not limited to those precise embodiments, and that various other changes and modifications may be effected therein by one skilled in the art without departing from the scope or spirit of the invention.

What is claimed is:

1. A flow sensor comprising:
    a mounting plate, the mounting plate being adapted to be mounted to an internal surface of a conduit, the conduit directing a flow of a medium therethrough;
    a bending plate, the bending plate being flexibly coupled to the mounting plate, the bending plate being displaced in response to the flow of medium through the conduit; and
    a sensing assembly, the sensing assembly being positioned on the bending plate, the sensing assembly including at least one sensor adapted for sensing a thermal change in response to the flow of the medium during a thermal mode, the sensing assembly including at least one sensor adapted for sensing a change in displacement of the bending plate in response to the flow of the medium during a displacement mode, the at least one sensor adapted for sensing the thermal change outputting a thermal mode signal, the thermal mode signal being representative of the thermal change in response to the flow of the medium, the at least one sensor adapted for sensing the change in displacement outputting a displacement mode signal, the displacement mode signal being representative of the change in displacement of the bending plate in response to the flow of the medium, whereby both a low flow condition and a high flow condition can be measured using the flow sensor.

2. The flow sensor as defined by claim 1, wherein the medium includes at least one of a gas, liquid, composition, and slurry.

3. The flow sensor as defined by claim 1, wherein the bending plate is positioned at an acute angle with the internal surface of the conduit.

4. The flow sensor as defined by claim 1, wherein the bending plate is positioned at an obtuse angle with the mounting plate when not substantially displaced.

5. The flow sensor as defined by claim 1, further comprising a blade, the blade being positioned on the bending plate to increase the displacement of the bending plate in response to the flow of the medium.

6. The flow sensor as defined by claim 1, wherein the at least one sensor adapted for sensing the thermal change and the at least one sensor adapted for sensing the change in displacement are positioned on a surface of the bending plate facing the flow of the medium.

7. The flow sensor as defined by claim 1, wherein the at least one sensor adapted for sensing the thermal change and the at least one sensor adapted for sensing the change in displacement include resistors electrically connected in a bridge configuration.

8. The flow sensor as defined by claim 7, wherein the at least one sensor adapted for sensing the thermal change is substantially isolated from the bridge configuration during the thermal mode.

9. The flow sensor as defined by claim 7, wherein the at least one sensor adapted for sensing the thermal change is substantially isolated from the bridge configuration during the thermal mode by electromechanical switches or field effect transistor (FET) switches.

10. The flow sensor as defined by claim 7, wherein the bridge configuration includes at least one resistor adapted for temperature compensation.

11. The flow sensor as defined by claim 7, wherein the at least one sensor adapted for sensing the change in displacement includes at least two resistors in opposing branches of the bridge configuration.

12. The flow sensor as defined by claim 1, wherein the at least one sensor adapted for sensing the thermal change and the at least one sensor adapted for sensing the change in displacement include resistors manufactured using photolithography on a thin film polycrystalline or a platinum layer.

13. The flow sensor as defined by claim 1, wherein the at least one sensor adapted for sensing the change in displacement is located in an area of the bending plate that is sensitive to mechanical stress due to displacement in response to the flow of the medium.

14. The flow sensor as defined by claim 1, wherein the bending plate is separated from the mounting plate by a bending axis, the at least one sensor adapted for sensing the change in displacement being located in proximity with the bending axis.

15. The flow sensor as defined by claim 1, wherein the bending plate is separated from the mounting plate by a bending axis, the at least one sensor adapted for sensing the change in displacement being positioned substantially perpendicular to the bending axis.

16. The flow sensor as defined by claim 1, wherein the bending plate is separated from the mounting plate by a bending axis, the at least one sensor adapted for sensing the thermal change being positioned substantially parallel to the bending axis.

17. The flow sensor as defined by claim 1, further comprising a functional layer, the functional layer including the at least one sensor adapted for sensing the thermal change and the at least one sensor adapted for sensing the change in displacement, the functional layer being positioned on the bending plate.

18. The flow sensor as defined by claim 17, further comprising at least one isolation layer, the at least one isolation layer being positioned between the functional layer and the bending plate.

19. The flow sensor as defined by claim 18, the isolation layer comprising silicon oxide or silicon nitride.

20. The flow sensor as defined by claim 1, wherein the bending plate includes polycrystalline silicon and the mounting plate includes at least one of silicon and glass.

21. The flow sensor as defined by claim 1, wherein the mounting plate and the bending plate are metallic.

22. The flow sensor as defined by claim 1, wherein the at least one sensor adapted for sensing the thermal change and the at least one sensor adapted for sensing the change in displacement are located on at least one of the mounting plate and the bending plate.

23. The flow sensor as defined by claim 1, further comprising at least one electrical contact, the at least one electrical contact being located on at least one of the mounting plate and the bending plate, the at least one electrical contact being electrically coupled to at least one of the at least one sensor adapted for sensing the thermal change and the at least one sensor adapted for sensing the change in displacement.

24. A flow sensing system comprising:
a flow sensor comprising:
a mounting plate, the mounting plate being adapted to be mounted to an internal surface of a conduit, the conduit directing a flow of a medium therethrough;
a bending plate, the bending plate being flexibly coupled to the mounting plate, the bending plate being displaced in response to the flow of medium through the conduit; and
a sensing assembly, the sensing assembly being positioned on the bending plate, the sensing assembly including at least one sensor being adapted for sensing a thermal change in response to the flow of the medium during a thermal mode, the sensing assembly including at least one sensor adapted for sensing a change in displacement of the bending plate in response to the flow of the medium during a displacement mode, the at least one sensor adapted for sensing the thermal change outputting a thermal mode signal, the thermal mode signal being representative of the thermal change in response to the flow of the medium, the at least one sensor adapted for sensing the change in displacement outputting a displacement mode signal, the displacement mode signal being representative of the change in displacement of the bending plate in response to the flow of the medium, whereby both a low flow condition and a high flow condition can be measured using the flow sensor;
a processor, the processor being responsive to the thermal mode signal and the displacement mode signal; and
a memory, the memory being operatively coupled to the processor.

25. The flow sensing system as defined in claim 24, wherein the memory is adapted for storing at least one calibration coefficient, the at least one calibration coefficient being used to adjust at least one of the thermal mode signal and the displacement mode signal.

26. The flow sensing system as defined in claim 24, further comprising a computer, the computer being operatively coupled to the processor, the computer controlling calibration of at least one of the thermal mode signal and the displacement mode signal.

27. The flow sensing system as defined in claim 24, further comprising a computer, the computer being operatively coupled to the processor, the computer calculating the at least one calibration coefficient.

28. The flow sensing system as defined in claim 24, wherein the processor includes at least one of a microprocessor, microcontroller, application specific integrated circuit (ASIC), field programmable gate array (FPGA), and programmable array logic (PAL).

29. The flow sensing system as defined by claim 24, wherein the at least one sensor adapted for sensing the thermal change and the at least one sensor adapted for sensing the change in displacement are positioned on a surface of the bending plate facing the flow of the medium.

30. The flow sensing system as defined by claim 24, wherein the at least one sensor adapted for sensing the thermal change and the at least one sensor adapted for sensing the change in displacement include resistors electrically connected in a bridge configuration.

31. The flow sensing system as defined by claim 30, wherein the at least one sensor adapted for sensing the thermal change is substantially isolated from the bridge configuration during the thermal mode by two electromechanical switches or field effect transistor (FET) switches.

32. The flow sensing system as defined by claim 24, further comprising at least one amplifier operatively coupling the thermal mode signal to the processor.

33. The flow sensing system as defined by claim 24, further comprising at least one amplifier operatively coupling the displacement mode signal to the processor.

34. A gas flow sensor comprising:
   a mounting plate, the mounting plate being adapted to be mounted to an internal surface of a conduit, the conduit directing a flow of a medium therethrough;
   a bending plate, the bending plate being flexibly coupled to the mounting plate, the bending plate being displaced in response to the flow of medium through the conduit; and
   a sensing assembly, the sensing assembly being positioned on the bending plate, the sensing assembly including at least one sensor adapted for sensing a thermal change in response to the flow of the medium during a thermal mode, the sensing assembly including at least one sensor adapted for sensing a change in displacement of the bending plate in response to the flow of the medium during a displacement mode, the at least one sensor adapted for sensing the thermal change outputting a thermal mode signal, the thermal mode signal being representative of the thermal change in response to the flow of the medium, whereby both a low flow condition and a high flow condition can be measured using the flow sensor, the at least one sensor adapted for sensing the change in displacement outputting a displacement mode signal, the displacement mode signal being representative of the change in displacement of the bending plate in response to the flow of the medium, the at least one sensor adapted for sensing the thermal change and the at least one sensor adapted for sensing the change in displacement being positioned on a surface of the bending plate facing the flow of the medium, the at least one sensor adapted for sensing the thermal change and the at least one sensor adapted for sensing the change in displacement including resistors electrically connected in a bridge configuration, the at least one sensor adapted for sensing the thermal change being substantially isolated from the bridge configuration during the thermal mode, the at least one sensor adapted for sensing the change in displacement being located in an area of the bending plate that is sensitive to mechanical stress due to displacement in response to the flow of the medium.

* * * * *

UNITED STATES PATENT AND TRADEMARK OFFICE
CERTIFICATE OF CORRECTION

PATENT NO. : 6,769,299 B2
DATED : August 3, 2004
INVENTOR(S) : Förster et al.

It is certified that error appears in the above-identified patent and that said Letters Patent is hereby corrected as shown below:

Title page,
Item [73], Assignee, "Fetso Corporation, Hauppauge NY", should read -- Festo Corporation, Hauppauge, NY --.

Column 5,
Line 47, "layers are a-silicon" should read -- layers are α-silicon --

Signed and Sealed this

Seventh Day of December, 2004

JON W. DUDAS
*Director of the United States Patent and Trademark Office*